United States Patent [19]
Roberts

[11] 3,752,000

[45] Aug. 14, 1973

[54] VARIABLE SPEED FRICTION DRIVE TRANSMISSION

[75] Inventor: Richard W. Roberts, Lombard, Ill.

[73] Assignee: Borg-Warner Corporation, Chicago, Ill.

[22] Filed: Dec. 17, 1971

[21] Appl. No.: 209,087

[52] U.S. Cl. ................................. 74/190.5, 74/200
[51] Int. Cl. ..................... F16h 15/04, F16h 15/08
[58] Field of Search ................... 74/190.5, 190, 198, 74/200

[56] References Cited
UNITED STATES PATENTS

| | | | |
|---|---|---|---|
| 2,951,384 | 9/1960 | Rouverol | 74/200 X |
| 3,033,048 | 5/1962 | Perruca | 74/200 |
| 3,204,476 | 9/1965 | Rouverol | 74/198 |
| 3,367,198 | 2/1968 | Schottler | 74/198 |

Primary Examiner—Leonard H. Gerin
Attorney—William S. McCurry et al.

[57] ABSTRACT

A friction drive transmission featuring a plurality of balls subjected to a compressive force, necessary to the transmission of driving torque from a driving friction member to a driven friction member, produced by an automatic self-energizing wedging action between the balls and the driving and driven members to provide one or more finite speed rations.

26 Claims, 14 Drawing Figures

Patented Aug. 14, 1973

INVENTOR
RICHARD W. ROBERTS
BY Robert L. Zieg
ATTORNEY

INVENTOR
RICHARD W. ROBERTS
BY Robert L. Zieg
ATTORNEY Patented Aug. 14, 1973

INVENTOR
RICHARD W. ROBERTS
BY Robert L. Zieg
ATTORNEY

VARIABLE SPEED FRICTION DRIVE TRANSMISSION

This invention generally relates to variable speed transmissions and more particularly to such transmissions of the friction drive type.

Certain friction drive transmissions employ balls compressed between and thereby forcibly engaged with surfaces of the driving and driven members to transmit torque between the members solely by frictional forces. The balls are movable by changes in compressive forces to different drive positions between the members to provide infinitely variable speed ratios. Self-energizing shifting action of the balls to obtain change in speed ratio is usually accomplished by control mechanism, which may be a cam and roller arrangement, responsive to momentary magnitude of the transmitted torque.

In such variable speed ratio friction drive transmissions, the ball-engaging surfaces of the driving and driven members do not conform very closely with the curvature of the balls and, accordingly, little contact area is had between the balls and the surfaces during the infinite number (by definition) of different orientations necessary to provide the continuously variable speed ratios. The metal, forming the balls and drive and driven members, is preferably steel providing a very low friction coefficient, which is further impaired by the necessary oil for lubrication. The very high localized Hertzian stresses encountered at the contact points of the balls and members limit the load-carrying capacity of the transmission and also deleteriously affect the useful life span of the friction drive components since the balls spall or Brinell with consequent destruction of the drive balls.

The present invention is directed to, and has for its principal object, a variable speed friction drive transmission featuring large engagement areas of the balls and drive and driven members to minimize compressive stresses and substantially increase the torque capacity and thereby the load-carrying capability while considerably lengthening the useful life of the transmission. This desirable object is obtained by having the engaging portions of the drive and driven members conform closely to the balls. More particularly, in the preferred exemplary embodiment, the drive and driven members are relatively rotatable about parallel axes with balls disposed in and between opposed ball-conforming grooves in the members in a manner that the balls are free of driving contact with the members in one position thereof, but are movable to a second position, to contact surfaces of both grooves for drivingly engaging the members, the consequent squeeze action on the balls by the members being self-energizing and increasing in proportion to the input torque of the driving member.

Accordingly, another important object of the invention is to provide an improved transmission of the friction drive type having balls disposed and movable between relative rotatable axially spaced drive and driven members for operatively coupling the same in a plurality of variable speed ratios.

Another object of the invention is to provide an improved transmission of the friction drive type in which spaced friction drive and driven members are rotatable with each member being provided with grooves concentric to its axis and intersecting the grooves of the other member, and with balls positioned in the grooves of the members for movement by an external force into driving engagement with the members.

Another object of the invention is to provide an improved transmission of the friction drive ball type in which spaced friction drive and driven members may be in the shape of discs, cones or cylinders, having grooves in cooperative relationship with each other and in closely conforming curvature to the drive balls received therebetween to connect the drive member to the driven member in a plurality of finite speed ratios.

DESCRIPTION OF THE PREFERRED EMBODIMENT

Figure 1:
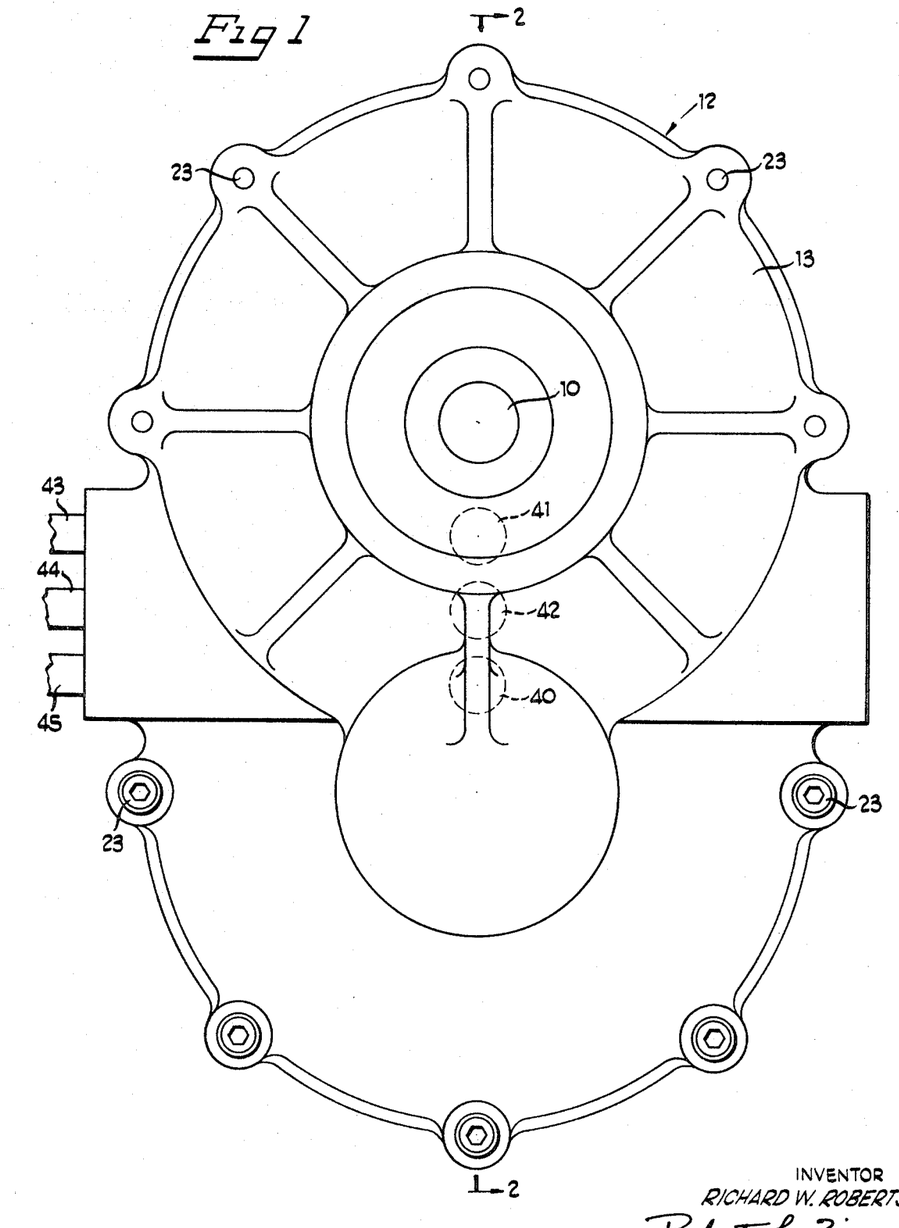
FIG. 1 is a side view of a variable speed friction drive transmission showing a preferred embodiment of the present invention.
Figure 2:
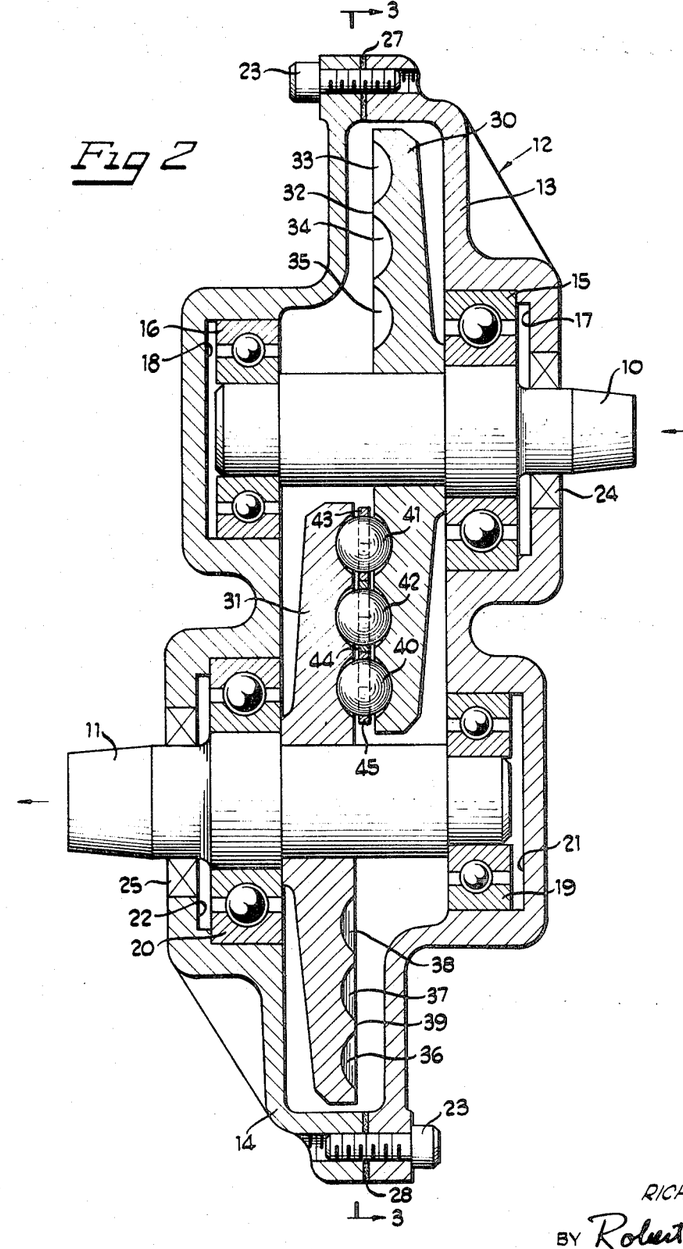
FIG. 2 is a vertical sectional view of the transmission, taken on line 2—2 of FIG. 1, and illustrating driving and driven shafts, and transmission balls between upper and lower grooved discs connected to the shafts.

Referring now to FIGS. 1–4, the illustrated variable speed friction drive transmission of the present invention comprises an input shaft 10 connected to a power source or engine (not shown) and an output shaft 11 which may be connected to a load such, for example, as an automotive accessory in the form of air-conditioning compressor (not shown). The shafts 10 and 11 are mounted in the transmission casing or housing 12 and in parallel relation to each other. As shown in FIG. 2, the casing 12 is provided by two hollow engaged sections 13 and 14, the shaft 10 being rotatable in a pair of bearings 15 and 16 positioned in pockets 17 and 18 in the casing sections 13 and 14, and the shaft 11 also being revolvable in a pair of bearings 19 and 20 in pockets 21 and 22 in the casing sections 13 and 14.

As shown in FIG. 2, the casing sections 13 and 14 are connected together by a plurality of bolts 23, the sections 13 and 14 having a gasket 27 therebetween and in sealing relation therewith to confine lubricating oil within the casing, the shafts also having annular oil seals 24 and 25 respectively positioned on the ends of shafts 10 and 11 and in sealing relation to the shafts and the adjacent circular edges of openings in the casing sections 13 and 14.

Figure 3:
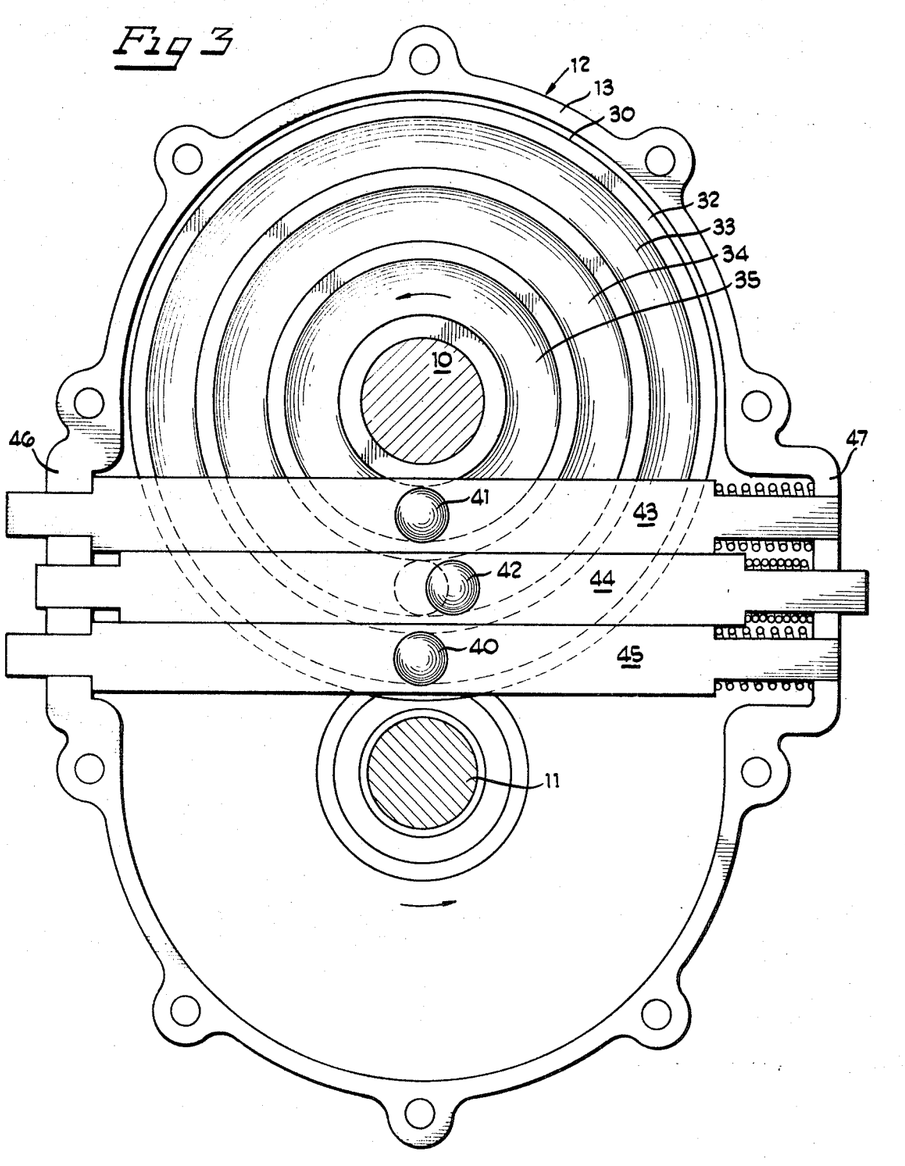
FIG. 3 is a vertical sectional view of the transmission, taken on line 3—3 of FIG. 2, and illustrating the upper drive disc and the balls, and controls for operating the balls to provide various speed ratio changes.
Figure 4:
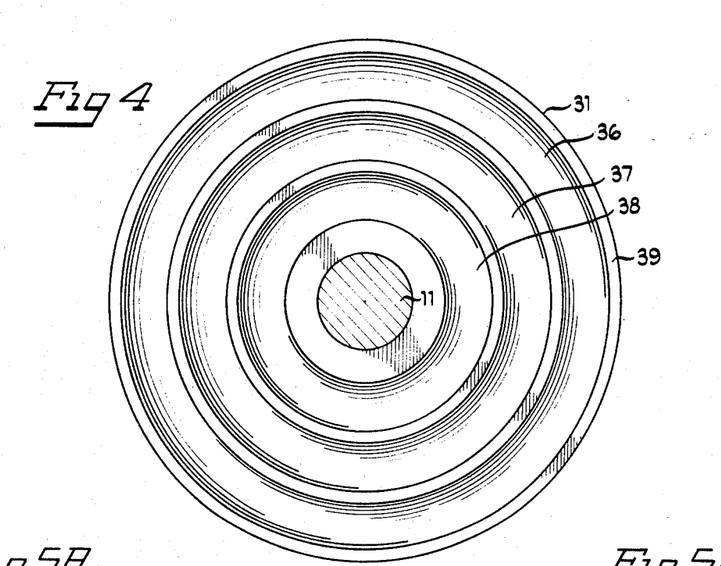
FIG. 4 is a face view of the driven grooved disc shown in FIG. 2.
Figure 5A:
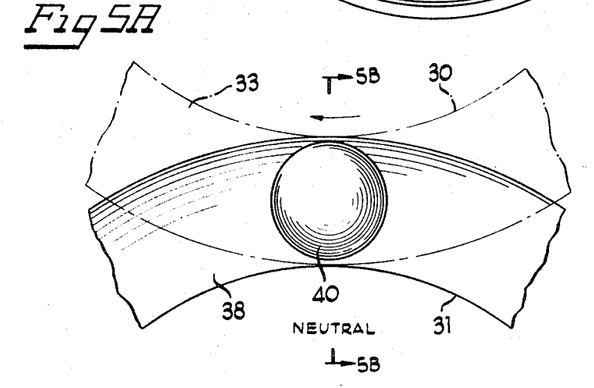
FIGS. 5A and 5B are schematic views of a transmission ball positioned in grooves of the drive and driven discs of FIG. 2 in the neutral condition of the transmission.
Figure 5B:
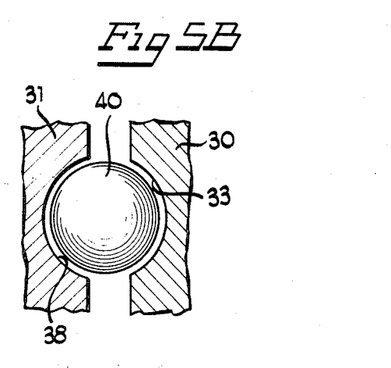
Figure 6A:
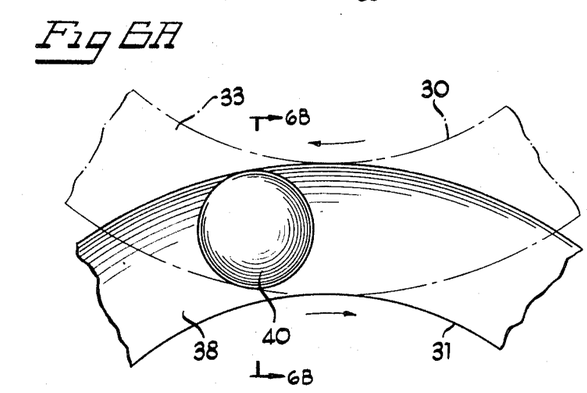
FIGS. 6A and 6B are schematic views similar to FIGS. 5A and 5B but illustrating the ball position in the grooves of the drive and driven discs during driving engagement between the balls and discs.
Figure 6B:
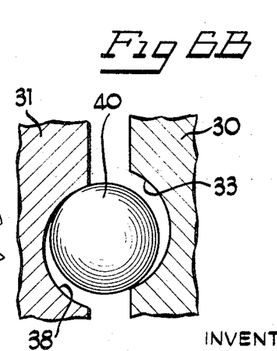

Friction drive mechanism is provided in the form of drive means including a drive member 30 connected to the input shaft 10, driven means including a driven member 31 connected to the output shaft 11, and a plurality of balls between and movable into torque-transmitting engagement with the drive and driven members 30 and 31. As shown in FIGS. 2, 3 and 4, the drive member 30 is in the shape of an annular disc located within the hollow housing section 13 and is fixed to the input shaft 10 for rotation therewith. The disc 30 has a flat face 32 having three circular or annular grooves 33, 34 and 35 concentric to, and in radially spaced relation to, the axis of rotation of the input shaft 10. The driven member 31 is an annular disc, similar to the disc 30, and is positioned in the hollow housing section 14. The disc 31 is mounted on shaft 11 for rotating shaft 11 and is also provided with three circular or annular grooves 36, 37 and 38 in its flat face 39, the grooves being concentric to, and in radially spaced relation to, the axis of the output shaft. As shown in FIGS. 2, 3, 5A and 5B, and 6A and 6B, the grooves in the discs 30 and 31 are so located with respect to each other, that the radially outer groove 33 of the disc 30 overlaps or intersect- the radially inner groove 38 of the disc 31, and a ball 40 is disposed within the intersecting portions of the grooves 33 and 38; the radially inner groove 35 of the disc 30 intersects the radially outer groove 36 of the disc 31, and a ball 41 is positioned within these intersecting portions of the grooves 35 and 36; and, also, the grooves 34 and 37 in discs 30 and 31, located respectively radially intermediate the other grooves of the associated disc, intersect, and a ball 42 is positioned in the intersecting portions of the grooves 34 and 37.

The transmission is capable of providing three finite speed ratios, namely, underdrive, direct drive and overdrive speed ratios. The balls are normally maintained by control elements or bars 43, 44 and 45 in positions centering the balls between the grooved discs and free from wedging contact with the grooved portions thereof to neutralize the transmission. The bars are individually and selectively shiftable to move the balls to provide the described speed ratios. More particularly, and referring to FIGS. 2, 3, 5A, 5B, 6A and 6B, the control bars 43, 44 and 45 have openings for reception of the balls 41, 42 and 40, and the bars are mounted in slots in the casing 12 for sliding movement tangentially of the grooves in the discs 30 and 31, each bar having its end positioned in aligned openings in spaced walls 46 and 47 of the casing. The left end of each bar (FIG. 3) extends outwardly of the casing for external application of force for actuating the bar to push its ball off-center, in the same direction as the input shaft tends to drive it, from its neutral position shown in FIGS. 5A and 5B to the position shown in FIGS. 6A and 6B in which the ball contacts and wedges between the intersecting portions of the discs for driving rolling engagement of the discs 30 and 31. When it is desired to neutralize the transmission, the external force on the activated bar 43, 44 or 45 is released and a compressed spring 48, 48′ or 48″ is effective to move the bar to its initial position.

Referring to FIG. 3, movement of the control bar 44 to the right causes the ball 42 to be actuated from its groove-disengaging centered position, shown in dotted lines, to the full line position in which the ball contacts the intersecting portions of grooves 34 and 37 of the discs 30 and 31 for driving engagement with the discs 30 and 31 to provide a direct drive or 1:1 speed ratio, the groove 34 being located radially at the same distance from the axis of rotation of the disc 30 as the groove 37 is from the axis of rotation of the disc 31. When an underdrive speed ratio is desired, the control bar 43 is moved to the right from its centered position, shown in FIG. 3, to engage the ball 41 with grooves 35 and 36 of the discs 30 and 31, the groove 35 being located radially inwardly of the grooves 32 and 33 of the disc 30 and the groove 36 being radially outwardly of the grooves 37 and 39 of the disc 31 to provide a 2:1 underdrive speed ratio. An overdrive speed ratio is obtained by movement of the bar 45 to the right in FIG. 3 so as to engage the ball 40 with the groove 38 of the disc 31 and groove 33 of disc 30, groove 38 being disposed radially inwardly of grooves 36 and 37 of disc 31 and groove 33 radially outwardly of grooves 34 and 35 of disc 30 to provide a 1:2 overdrive speed ratio.

In this preferred exemplary embodiment of the invention, it is believed apparent that the three individual balls are centered between discs having groove dimensions such as to provide the aforesaid speed ratios of 2:1 underdrive, 1:1 direct drive, and 1:2 overdrive. When the balls are on center between the disc shafts' centerlines, the grooves of the discs do not contact the balls and the drive is disengaged. When any one ball is moved off center in the same direction as the input shaft 10 tends to drive it, the ball wedgingly contacts both of the intersecting grooved portions of the discs for rolling driving engagement of the balls and discs. The squeeze action on the ball is self-energizing and increases in proportion to the driving torque. Another unique feature of the transmission, in addition to the groove and ball arrangement providing a self-energizing squeeze on the ball, is the relatively close conformity of the grooves to the ball which minimizes the compressive stresses and substantially increases the torque capacity and thereby the load-carrying capability while considerably lengthening the useful life of the transmission.

In this embodiment, it will be obvious that, when the input shaft to the output shaft is driven at engine speeds between 500 and 5000 RPM, the output shaft speed can be held between 1000 and 2500 RPM.

Other transmission configurations are possible by putting in additional grooved discs to compound the number of speed ratios or placing several balls in parallel to share the torque load, without departing from the inventive concept.

Figure 7:
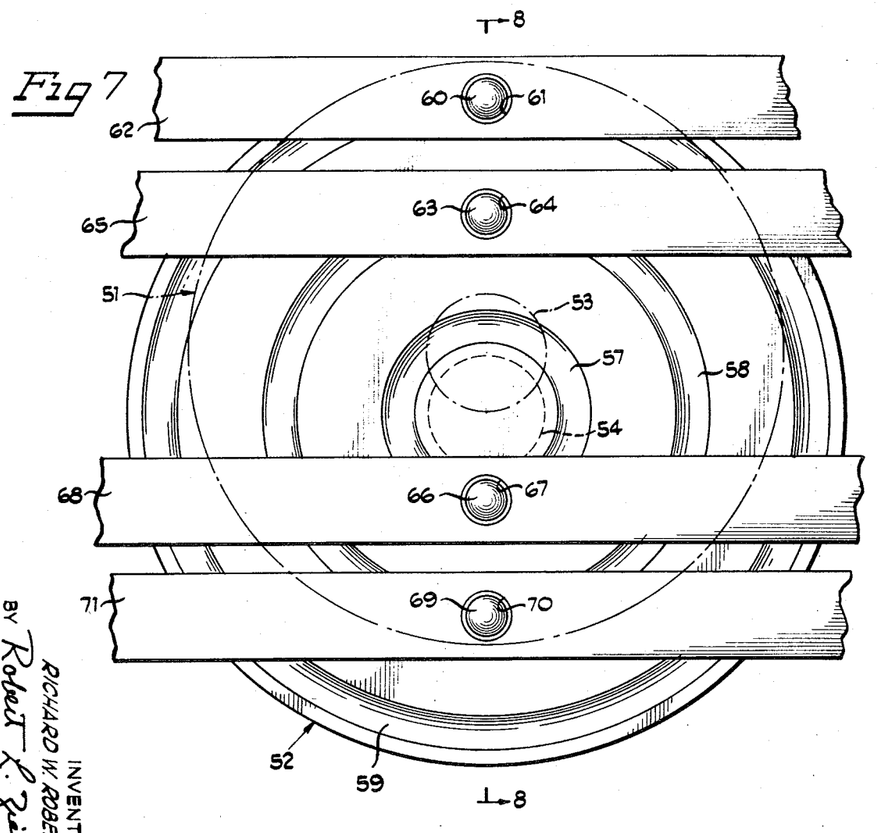
FIG. 7 is a vertical sectional view of a friction drive transmission showing a second embodiment of the present invention.
Figure 8:
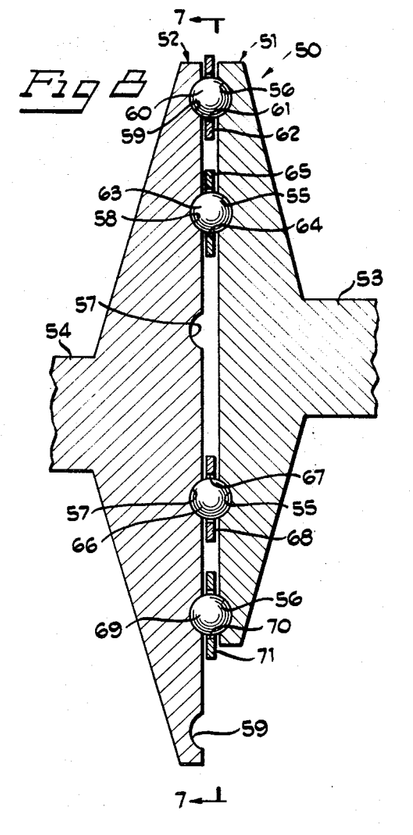
FIG. 8 is a vertical sectional view taken on line 8—8 of FIG. 7.

DESCRIPTION OF THE EMBODIMENT OF FIGS. 7 and 8

In the embodiment of the invention illustrated in FIGS. 7 and 8, the transmission 50 comprises driving means including a driving member or disc 51, and driven means including a driven member or disc 52, the driving disc 51 being integral with and rotatable by an input shaft 53 connected to an engine or other power source (not shown), and the driven disc 52 being integral with and rotatable with an output shaft 54 connected to a load. The driving disc 51 is provided with a pair of annular grooves 55 and 56 concentric to the axis of rotation of the input shaft 53, and in radially spaced relation so that the outer groove 56 is substantially larger than the inner groove 55. Also, the driven disc 52 has annular grooves 57, 58 and 59 concentric to the axis of rotation of the output shaft 54, and in radially spaced relation to provide an outer groove 59, inner groove 57 and intermediate groove 58.

In the present transmission, the axes of rotation of the input and output shafts 53 and 54 are parallel to position the grooves in the discs in an intersecting relation so that a ball 60 can be disposed in groove 56 of disc 51 and a groove 59 of disc 52 and in a circular opening 61 in a control member or rod 62, a ball 63 in groove 55 of disc 51 and groove 58 of disc 52 and in a circular opening 64 in control member or rod 65, a third ball 66 in groove 55 of disc 51 and groove 57 in disc 52 and also in a circular opening 67 in control member or rod 68, and a fourth ball 69 is located in groove 56 of disc 51 and groove 58 of disc 52 and in a circular opening 70 of a control member or rod 71.

The operation of the transmission shown in FIGS. 7 and 8 by its control members 62, 65, 68 and 71 is similar to that disclosed in FIGS. 1 – 6 as movement of any of the control members will activate its associated ball and cause wedging action of the ball and its conforming grooves to provide rolling driving engagement of the ball with the discs. In FIGS. 7 and 8, the balls are disengaged from the discs in the positions of the control rods shown, the balls being located on the centerline between the shafts. The balls are selectively movable by the control rods from their centerline positions into driving engagement with the intersecting groove portions of the discs. It may be noted that four different speed ratios are available by selectively actuating the control rods to move the associated ball 60, 63, 66 or 69 to engaged position.

It will be apparent the advantageous and novel features, described with reference to the transmission of FIGS. 1–6, are also present in the transmission of FIGS. 7 and 8, as the squeeze action on the balls is also self-energizing and increases in proportion to the driving torque, while conformity of the contour of the grooves and balls keep the compressive stresses at a low value and increases torque capacity.

Figure 9:
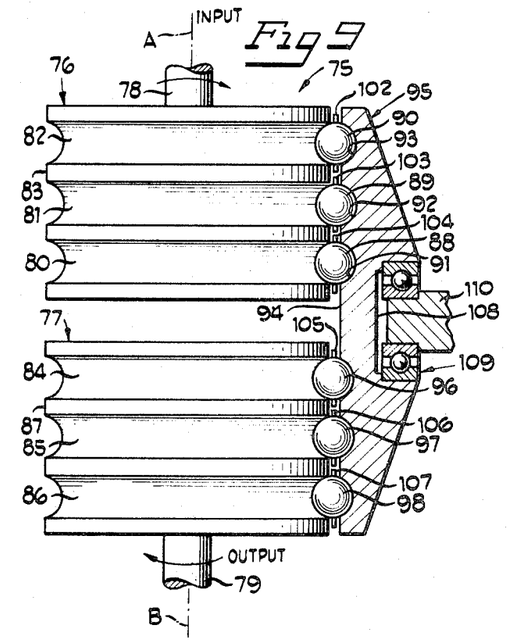
FIG. 9 is a side elevational view of a friction drive transmission illustrating a third embodiment of the present invention.
Figure 10:
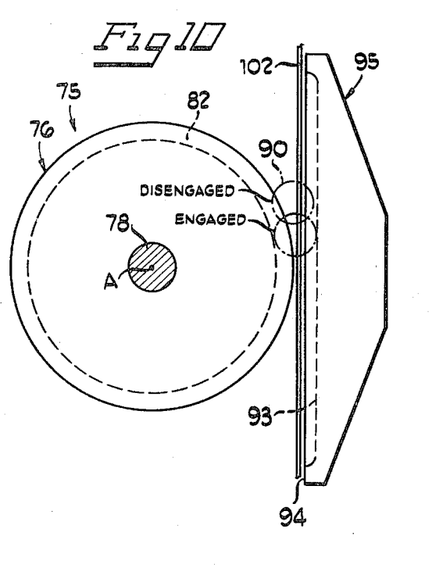
FIG. 10 is a top view of the transmission shown in FIG. 9.

DESCRIPTION OF THE EMBODIMENT OF FIGS. 9 and 10

FIGS. 9 and 10 illustrate a transmission 75 having driving and driven means including a cylinder and disc arrangement having the novel conforming groove-ball and wedging principle shown in the transmissions of FIGS. 1–6 and FIGS. 7 and 8.

More particularly, the transmission 75 comprises driving and driven means or members in the form of cylinders or drums 76 and 77. The driving drum 76 has an input shaft 78 connected thereto, the drum 76 and shaft 78 being rotatable about an axis A. The driven means includes a driven drum 77 connected to an output shaft 79 and therewith rotates about an axis B, the axes A and B being in alignment as shown in FIG. 9.

The drums 76 and 77 are substantially identical, the drum 76 having circular grooves 80, 81 and 82 in its cylindrical surface 83, and the drum 77 having circular grooves 84, 85 and 86 in its cylindrical surface 87. A plurality of balls 88, 89 and 90 are positioned in the grooves 80, 81 and 82 of drum 76 and also in annular grooves 91, 92 and 93 in the planar face 94 of an intermediate driven means or member in the form of an idler disc 95. A plurality of balls 96, 97 and 98 are also located in the grooves 84, 85 and 86 of drum 77 and also in grooves 91, 92, 93 in the face 94 of disc 95.

The disc 95 is spaced from the drums 76 and 77 and is mounted so that, in the neutral condition of the transmission, the balls are disengaged from driving relation with the disc and drums and, in the various speed ratio drive conditions of the transmission, the driving drum 76, via balls 88, 89 or 90, causes the disc 95 to rotate, and to transmit drive between the drums. The disc has its central portion provided with an opening 108 receiving a bearing assembly 109 rotatably supporting the disc on the end of a stationary stub shaft 110 fixed to the transmission housing (not shown). The disc is thus rotatable about the axis C of shaft 110, which axis is at a right angle to the axes A and B.

A plurality of control members or rods 102, 103 and 104 are provided between the drum 76 and the disc 95 and have circular openings receiving the balls 88, 89 and 90, the rods being selectively manually operable to provide wedging engagement of the ball 88, 89 or 90 with the drum 76 and disc 95 to cause drive to be transmitted from the input shaft 78 to the disc 95. Additional control members or rods 105, 106 and 107 are disposed between the drum 77 and the disc 95 and have circular openings for receiving balls 96, 97 and 98, these rods also being selectively manually movable to cause wedging engagement of the ball 96, 97 or 98 with the disc 95 and drum 77 to provide for torque transfer from the then-driving disc 95 to the driven drum 77 and output shaft 79. It will be noted that, in this transmission, as shown in FIG. 10, the balls are disengaged off the centerline and are engaged by movement of the balls toward the centerline between the shafts 78 and 79.

The transmission is controllable to provide for seven usable forward speed ratios, namely, three different overdrive speed ratios; direct drive (in three different combinations) and three underdrive speed ratios. More particularly, a first underdrive ratio is obtained between input and output shafts 78 and 79 by movement of control rod 102 to wedge ball 90 between drum 76 and disc 95 and by movement of control rod 105 to wedge ball 96 between disc 95 and drum 77 to thereby drive the output shaft 79 at a speed greater than the speed of the input shaft 78. A second underdrive speed ratio can be provided by movement of control rod 105 to wedge ball 90 between the drum 76 and disc 95 by movement of control rod 106 to wedge ball 97 between disc 95 and drum 77. A third underdrive speed ratio is available by moving control rod 103 to wedge ball 89 between drum 76 and disc 95 and by moving control rod 105 to wedge ball 96 between disc 95 and drum 77.

A first 1:1 speed ratio or direct drive of the input and output shafts can be obtained by actuating control rod 102 to wedge ball 90 between drum 76 and disc 95 and actuating control rod 107 to wedge ball 98 between the disc 95 and actuating control rod 107 to wedge ball 98 between the disc 95 and drum 77. The second 1:1 speed ratio is obtainable upon movement of control rod 103 to wedge ball 89 between the drum 76 and disc 95 and by movement of control rod 106 to drivingly engage ball 97 with disc 95 and drum 77. Similarly, engagement of control rods 104 and 105 will provide a 1:1 ratio. The first overdrive speed ratio is available by actuating control rod 103 to wedge ball 89 between drum 76 and disc 95 and by movement of control rod 107 to wedge ball 98 between the disc 95 and drum 77. The combination of control rod 104 with either control rod 106 or 107 will give two more usable overdrive ratios.

It will be apparent that the transmission shown in FIGS. 9 and 10 provides for the drive and driven elements having grooves conforming closely to the contour of the balls providing a resultant increase in load-carrying capability.

Figure 11:
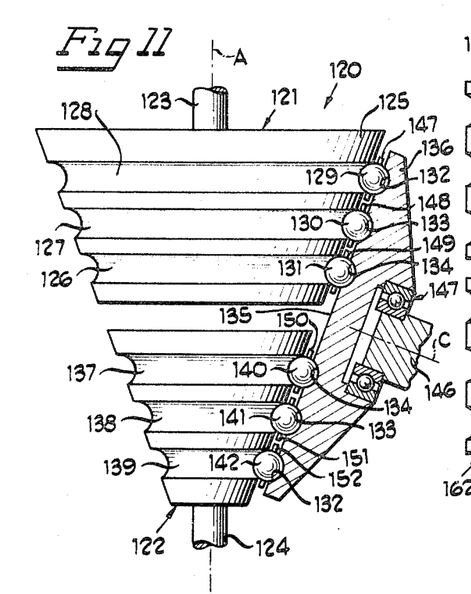
FIG. 11 is a side elevation of a friction drive transmission illustrating a fourth embodiment of the present invention.

DESCRIPTION OF THE EMBODIMENT OF FIG. 11

FIG. 11 illustrates a transmission 120 embodying driving and driven cones and a disc having intersecting grooves and containing balls controllable to drivingly connect the driving cone to the disc and the disc to the driven cone. More particularly, the transmission comprises driving and driven means or members in the form of large and small cones 121 and 122. The cone 121 is connected to a shaft 123 and is rotatable about an axis A. The cone 122 is connected to a shaft 124 and is also rotatable about the axis A.

The cone 121 has its exterior surface 125 provided with three annular grooves 126, 127 and 128 receiving balls 129, 130 and 131, the balls also being positioned within grooves 132, 133 and 134 in the planar face 135 of a driven member or idler disc 136. In like manner, the cone 121 has three annular grooves 137, 138 and 139, receiving balls 140, 141 and 142, the balls also being positioned in grooves 134, 133 and 132 in face 135 of the disc 136.

The disc 136 is rotatably mounted on a stationary stub shaft 146 fixed to the transmission housing (not shown) by means of a bearing 147 having its outer race received within and fixed to the disc 136 and its inner race secured to the stub shaft 146. The disc is rotatable about an axis C inclined to the axis A.

To control selective driving engagement of the balls 129, 130 and 131 with the cone 121 and disc 136, control members or rods 147, 148 and 149 have openings receiving the balls, and the rods are movable from their ball-disengaged off-centerline positions toward the ball-engaging centerline positions. Similarly, the wedging rolling engagement of the balls 140, 141 and 142 with the cone 122 and disc 136 is selectively controllable by the control members or rods 150, 151, 152 having openings receiving the balls, and being moved from their ball-disengaged off-centerline positions toward the ball-engaging centerline positions.

In this cone-type transmission, input torque from an engine may be applied to the shaft 124, and selective actuation of the control members 147, 148 and 149 and the control members 150, 151 and 152 can provide, due to the cone sizes, nine different step-down speed ratios between the input shaft 124 and the output shaft 123. Conversely, in the event that input torque from the engine is applied to the shaft 123, selective actuation of the control members 147, 148 and 149 and the control members 150, 151 and 152 will provide due to the transmittal of torque from the large cone 121 to the small cone 122, nine different step-up speed ratios between the input shaft 123 and output shaft 124.

Figure 12:
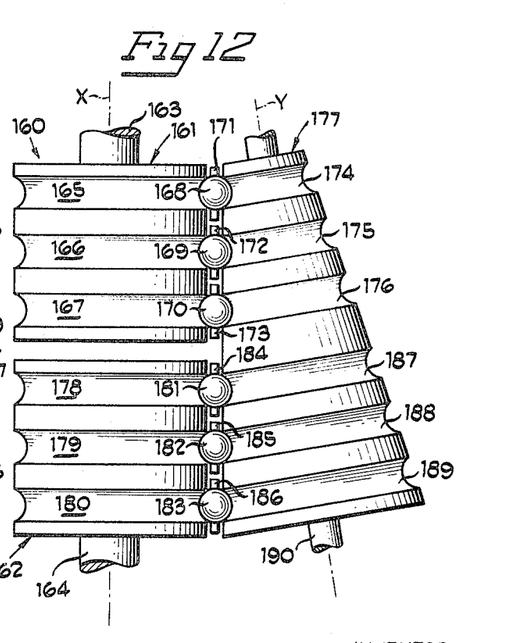
FIG. 12 is a side elevation of a friction drive transmission illustrating a fifth embodiment of the present invention.

DESCRIPTION OF THE EMBODIMENT OF FIG. 12

FIG. 12 discloses a combination cylinder or drum and cone type transmission 160, in which balls are provided between and disposed in intersecting grooves of the cone and cylinders. More particularly, the transmission comprises spaced driving and driven means or members in the form of cylinders or drums and a cone, the drums 161 and 162 being respectively connected to shafts 163 and 164 and rotatable about a common axis X. The drum 161 has three annular grooves 165, 166 and 167 in its cylindrical surface for receiving balls 168, 169 and 170 positioned within openings in tangentially movable control members or rods 171, 172 and 173 and in grooves 174, 175 and 176 of a driven member or idler cone 177. The drum 162 is similar to drum 161, the drum 162 having three annular grooves 178, 179 and 180 in its cylindrical surface for receiving balls 181, 182 and 183 positioned within openings in control members or rods 184, 185 and 186 and in grooves 187, 188 and 189 of the cone 177. The cone 177 is rotatably mounted on a shaft 190 having its axis Y inclined at an acute angle to the axis X so as to locate the grooves 174, 175, 176 and 187, 188 and 189 in proximity to the grooves 165, 166 and 167 of drum 161 and the grooves 178, 179 and 180 of drum 162 to insure proper positioning and rolling wedging engagement of the balls 168, 169 and 170 and 181, 182 and 183 in the grooves as described.

In the operation of the transmission, selective movement of the control rods 171, 172 or 173, coupled with selective operation of the control rods 184, 185 or 186, will provide nine different speed ratios of the input and output shafts. More particularly and by way of example, movement of rod 171 will wedgingly engage ball 168 with groove 165 of drum 161 and groove 174 of cone 177 and movement of rod 184 will engage ball 181 with drum 162 and cone 177, to provide a predetermined speed ratio. Accordingly, selective movement of a control rod 171, 172 or 173, together with selective movement of a control rod 184, 185 or 186, will provide a predetermined desired speed ratio.

It will be apparent that there have been illustrated and described several forms of constructions of variable speed friction drive type transmissions embodying driving and driven members having substantially large areas conforming to and engageable with balls disposed between the members to reduce compressive stresses and thereby increase the torque capacity and load carrying capability of the transmission, the necessary compression forces between the balls and the driving and driven members being created by an automatic or self-energizing wedging action therebetween which increases in proportion to the input torque impressed on the driving member. However, it is obvious that many variations and modifications of the described and illustrated constructions will occur to those skilled in the art and which will come within the scope of the appended claims.

What is claimed is:

1. In a power transmission providing a plurality of fixed speed ratios, drive means including a rotatable drive member having spaced annular grooves; driven means including a rotatable driven member having spaced annular grooves overlapping said grooves of said drive member; balls disposed in said grooves at their overlapping points; and means for selectively moving said balls and operative to position the selected moved ball in wedging rolling engagement with said members to drivingly connect said members.

2. In a power transmission as defined in claim 1 in which said ball-moving means comprises control elements movable tangentially of said annular grooves to engage said balls and said members.

3. In a power transmission as defined in claim 2 in which said ball-moving means comprise control elements disposed between said members and having openings receiving said balls.

4. In a power transmission as defined in claim 1 in which each of said rotatable members have said grooves thereof concentric to its axis of rotation.

5. In a power transmission as defined in claim 1 in which each of said rotatable members has said grooves thereof concentric to its axis of rotation, and said ball-moving means comprises control elements between said members and having openings receiving said balls, said elements being movable tangentially of said annular grooves to engage said balls with said members.

6. In a power transmission as defined in claim 1 in which said drive and driven members are discs having parallel axes of rotation and the grooves of each disc are concentric to its axis of rotation and radially spaced from each other.

7. In a power transmission as defined in claim 6 in which each of said discs are in spaced relation to the axis of rotation of the other disc with said discs having their ball-receiving overlapping grooved portions disposed between said axes.

8. In a power transmission as defined in claim 6 in which said ball-moving means comprises control elements disposed between said axes and movable tangentially of said annular grooves to engage said balls with said discs.

9. In a power transmission as defined in claim 6 in which the annular grooves of each disc encircle and are disposed eccentrically to the axis of rotation of the other disc to provide for said ball-receiving intersecting overlapping portions of said grooves of said discs.

10. In a power transmission as defined in claim 1 in which said drive means includes an input shaft connected to said drive member and said driven means includes an output shaft connected to said driven member, a housing mounting said shafts with their axes of rotation parallel to each other, and in which said ball-moving means comprises control elements mounted in said housing for sliding movement transverse to said rotational axes of said shafts and tangentially of said grooves.

11. In a power transmission as defined in claim 10 in which said drive and driven members are discs connected respectively to said input and output shafts with the grooves of each disc being concentric to its axis of rotation and radially spaced from each other and with said overlapping grooves of each disc being reversely curved with respect to the intersecting grooves of the other disc.

12. In a power transmission as defined in claim 10 in which said control elements are mounted in said housing between and in spaced relation to said shafts.

13. In a power transmission as defined in claim 1 in which said overlapping portions of said annular grooves of each disc are reversely curved with respect to the overlapping portions of said annular grooves of the other disc.

14. In a power transmission as defined in claim 1 in which said rotatable drive member of said drive means comprises a cylinder, and said rotatable driven member of said driven means comprises a disc having its axis of rotation perpendicular to and intersecting the axis of rotation of said cylinder.

15. In a power transmission as defined in claim 14 in which said driven means also includes a rotatable second cylinder having annular grooves overlapping said grooves of said disc, the axes of rotation of said cylinders being in alignment, and other balls positioned in said overlapping grooves of said disc and said second cylinder, and including second means for selectively moving said other balls and operative to position the selected other ball in wedging rolling engagement with said second cylinder and said disc.

16. In a transmission as defined in claim 15 in which both of said ball-moving means includes control elements movable tangentially of said grooves of said cylinders and disc to drivingly engage said balls with said cylinders and disc.

17. In a transmission as defined in claim 14 in which said ball-moving means includes control elements movable tangentially of said grooves of said cylinder and disc to drivingly engage said balls with said cylinder and disc.

18. In a transmission as defined in claim 1 in which said rotatable drive member of said drive means comprises a cone, and said rotatable driven member of said driven means comprises a disc having its axis of rotation angularly inclined to the axis of rotation of said cone.

19. In a transmission as defined in claim 18 in which said axes of rotation of said cone and disc are disposed at an obtuse angle.

20. In a transmission as defined in claim 18 in which said driven means also includes a rotatable second cone having annular grooves overlapping said grooves of said disc, the axes of said cones being in alignment, and other balls positioned in said overlapping grooves of said second cylinder and said cone, and including second means for selectively moving said other balls and operative to position the selected other ball in wedging rolling engagement with said second cylinder and said cone.

21. In a transmission as defined in claim 18 in which said ball-moving means includes control elements movable tangentially of said grooves of said cone and said disc to drivingly engage said balls with said cone and said disc.

22. In a transmission as defined in claim 1 in which said rotatable drive member of said drive means comprises a cylinder, and said rotatable driven member of said driven means comprises a cone having its axis of rotation angularly inclined to the axis of rotation of said cylinder.

23. In a transmission as defined in claim 22 in which said axes of rotation of said cylinder and cone are disposed at an acute angle.

24. In a transmission as defined in claim 22 in which said driven means also includes a rotatable second cylinder having annular grooves overlapping said grooves of said cone, the axes of said cylinders being in alignment, and other balls positioned in said overlapping grooves of said second cylinder and said cone, and including second means for selectively moving said other balls and operative to position the selected other ball in wedging rolling engagement with said second cylinder and said cone.

25. In a transmission as defined in claim 24 in which both of said ball-moving means include control elements movable tangentially of said grooves of said cone and cylinders to drivingly engage said balls with said cone and cylinders.

26. In a transmission as defined in claim 22 in which said ball-moving means include control elements movable tangentially of said grooves of said cylinder and cone to drivingly engage said balls with said cylinder and cone.

* * * * *